US009923440B2

(12) United States Patent
Finkle

(10) Patent No.: US 9,923,440 B2
(45) Date of Patent: *Mar. 20, 2018

(54) HYBRID ELECTRIC MOTOR WITH SELF ALIGNING PERMANENT MAGNET AND SQUIRREL CAGE ROTORS

(71) Applicant: Louis J. Finkle, Lakewood, CA (US)

(72) Inventor: Louis J. Finkle, Lakewood, CA (US)

(73) Assignee: MOTOR GENERATOR TECHNOLOGY, INC., Signal Hill, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 14/229,673

(22) Filed: Mar. 28, 2014

(65) Prior Publication Data

US 2015/0194868 A1    Jul. 9, 2015

Related U.S. Application Data

(63) Continuation-in-part of application No. 14/151,333, filed on Jan. 9, 2014.

(51) Int. Cl.
*H02K 16/00* (2006.01)
*H02K 21/46* (2006.01)
(Continued)

(52) U.S. Cl.
CPC ............ *H02K 21/46* (2013.01); *H02K 16/02* (2013.01); *H02K 17/26* (2013.01); *H02K 1/22* (2013.01);
(Continued)

(58) Field of Classification Search
CPC ...... H02K 16/025; H02K 21/46; H02K 16/02; H02K 16/04; H02K 1/22; H02K 1/223;
(Continued)

(56) References Cited

U.S. PATENT DOCUMENTS

| 2,209,558 A | 7/1940 | Bing et al. |
| 2,209,588 A | 7/1940 | Bing et al. |

(Continued)

FOREIGN PATENT DOCUMENTS

| CN | 102868268 | * | 1/2011 | ............ H02K 16/02 |
| CN | 102868268 | * | 1/2013 | |

(Continued)

OTHER PUBLICATIONS

JPH11341757A English Translation.*

*Primary Examiner* — Bernard Rojas
*Assistant Examiner* — Maged Almawri
(74) *Attorney, Agent, or Firm* — Averill & Green; Kenneth L. Green

(57) ABSTRACT

A hybrid induction motor includes a fixed stator, an independently rotating outer rotor, and an inner rotor fixed to a motor shaft. In one embodiment the outer rotor includes spaced apart first bars and permanent magnets, and the inner rotor includes spaced apart second bars. In another embodiment the outer rotor includes angularly spaced apart first bars but no permanent magnets, and the inner rotor includes permanent magnets and may also include angularly spaced apart second bars. The outer rotor is initially accelerated by cooperation of a rotating stator magnetic field with the first bars. As the outer rotor accelerates towards synchronous RPM, the inner rotor is accelerated to transition to efficient synchronous operation. The outer rotor thus acts as a clutch to decouple the inner rotor from the rotating stator magnetic field at startup and to couple the inner rotor to the rotating stator magnetic field at synchronous speed.

20 Claims, 11 Drawing Sheets

(51) Int. Cl.
  *H02K 16/02* (2006.01)
  *H02K 17/26* (2006.01)
  *H02K 1/27* (2006.01)
  *H02K 1/22* (2006.01)
  *H02K 1/28* (2006.01)

(52) U.S. Cl.
  CPC .............. *H02K 1/223* (2013.01); *H02K 1/27* (2013.01); *H02K 1/2706* (2013.01); *H02K 1/276* (2013.01); *H02K 1/2786* (2013.01); *H02K 1/28* (2013.01)

(58) Field of Classification Search
  CPC ...... H02K 1/27; H02K 1/2706; H02K 1/2786; H02K 1/28; H02K 1/276
  USPC .......... 310/125, 144, 266, 166, 156.82, 212, 310/269, 211, 156.78–156.81, 156.53, 310/156.56, 156.57, 111, 112, 114
  See application file for complete search history.

(56) References Cited

U.S. PATENT DOCUMENTS

| | | | |
|---|---|---|---|
| 2,243,616 A | 5/1941 | Bing et al. | |
| 2,287,286 A | 6/1942 | Bing et al. | |
| 2,558,540 A | 6/1951 | Clos | |
| 2,864,017 A * | 12/1958 | Waltscheff | H02K 16/025 310/115 |
| 3,445,699 A * | 5/1969 | Beaudry | H02K 17/30 310/125 |
| 3,459,981 A * | 8/1969 | Dotto | H02K 21/145 310/156.82 |
| 4,151,431 A | 4/1979 | Johnson | |
| 4,285,725 A | 8/1981 | Gysel et al. | |
| 4,482,034 A | 11/1984 | Baermann | |
| 4,508,998 A | 4/1985 | Hahn | |
| 4,578,609 A | 3/1986 | McCarty | |
| 4,829,205 A * | 5/1989 | Lindgren | H02K 16/02 310/114 |
| 5,166,654 A | 11/1992 | Doyelle | |
| 5,285,124 A * | 2/1994 | Satake | H02K 19/14 310/114 |
| 5,508,576 A | 4/1996 | Nagate et al. | |
| 5,594,289 A | 1/1997 | Minato | |
| 5,886,443 A * | 3/1999 | Dymond | H02K 17/165 310/125 |
| 6,181,047 B1 | 1/2001 | Nitta | |
| 6,376,959 B1 | 4/2002 | Leupold | |
| 6,380,655 B1* | 4/2002 | Ide | H02K 16/02 310/181 |
| 6,771,000 B2 | 8/2004 | Kim et al. | |
| 6,864,773 B2 | 3/2005 | Perrin | |
| 7,459,815 B2 | 12/2008 | Han et al. | |
| 7,567,004 B2 | 7/2009 | Smith | |
| 7,741,746 B2 | 6/2010 | Groening | |
| 7,851,962 B1* | 12/2010 | Williams | H02K 16/04 310/113 |
| 7,928,621 B2* | 4/2011 | Han | H02K 16/00 310/112 |
| 8,072,108 B2 | 12/2011 | Finkle | |
| 8,097,993 B2 | 1/2012 | Finkle | |
| 8,288,908 B2 | 10/2012 | Finkle et al. | |
| 8,390,162 B2 | 3/2013 | Finkle et al. | |
| 2004/0014181 A1 | 3/2004 | Kuo | |
| 2004/0041481 A1 | 3/2004 | Kuo | |
| 2006/0038457 A1 | 2/2006 | Miyata et al. | |
| 2006/0175924 A1* | 8/2006 | Han | H02K 7/125 310/166 |
| 2006/0226722 A1* | 10/2006 | Kim | H02K 16/02 310/114 |
| 2007/0090707 A1 | 4/2007 | Moriya | |
| 2007/0216248 A1* | 9/2007 | Han | H02K 16/02 310/114 |
| 2007/0228856 A1 | 10/2007 | Bates et al. | |
| 2008/0169717 A1* | 7/2008 | Takashima | H02K 21/028 310/114 |
| 2008/0179987 A1* | 7/2008 | Imazu | H02K 1/246 310/216.059 |
| 2008/0272667 A1* | 11/2008 | Ionel | H02K 1/276 310/156.83 |
| 2009/0315329 A1* | 12/2009 | Duffey | H02K 16/02 290/44 |
| 2010/0219304 A1 | 9/2010 | Han et al. | |
| 2010/0219704 A1 | 9/2010 | Han et al. | |
| 2011/0101814 A1* | 5/2011 | Finkle | H02K 21/46 310/156.83 |
| 2011/0101815 A1* | 5/2011 | Finkle | H02K 21/028 310/191 |
| 2011/0156518 A1* | 6/2011 | Bright | H02K 19/106 310/103 |
| 2011/0163623 A1* | 7/2011 | Rens | H02K 7/11 310/114 |
| 2011/0101812 A1 | 11/2011 | Finkle et al. | |
| 2013/0057091 A1* | 3/2013 | Kim | H02K 21/44 310/46 |
| 2013/0193782 A1* | 8/2013 | Kusase | H02K 51/00 310/46 |
| 2013/0234553 A1* | 9/2013 | Kusase | H02K 16/02 310/114 |
| 2013/0278096 A1 | 10/2013 | Finkle | |
| 2013/0328436 A1* | 12/2013 | Oshida | H02K 17/165 310/211 |

FOREIGN PATENT DOCUMENTS

| | | |
|---|---|---|
| CN | 1360748 | 7/2014 |
| DE | 4421594 | 7/2014 |
| GB | 495813 | 11/1938 |
| JP | S 51-47208 | 4/1976 |
| JP | 62-117558 | 11/1988 |
| JP | 9065591 | 11/1988 |
| JP | 09065591 | 3/1997 |
| JP | H07-203644 A | 3/1997 |
| JP | H11341757 A * | 1/1999 |
| JP | 11-341757 | 12/1999 |
| JP | 11341757 * | 12/1999 |
| JP | 2002-315244 | 10/2002 |
| JP | 2003-088071 | 3/2003 |
| JP | 2003-088071 A | 3/2003 |
| JP | 2004 135377 A | 3/2003 |
| JP | 2004 140978 | 5/2004 |
| JP | 2004-140978 | 5/2004 |
| JP | 2004 336915 A | 11/2004 |
| JP | 2005-210826 | 8/2005 |
| JP | 2005-210826 A | 8/2005 |
| JP | 2006-254638 | 9/2006 |
| JP | 2006-352973 A | 9/2006 |
| JP | 2007-503199 | 2/2007 |
| JP | 2008-148455 | 6/2008 |
| JP | 2008-195251 | 8/2008 |
| JP | 2011-061933 | 3/2011 |
| KR | 10-2005-011667 | 12/2005 |
| KR | 10-2005-0116677 A | 12/2005 |
| WO | WO-88-05976 | 8/1988 |
| WO | WO 88/05976 | 8/1988 |
| WO | WO2004107539 | 8/1988 |

* cited by examiner

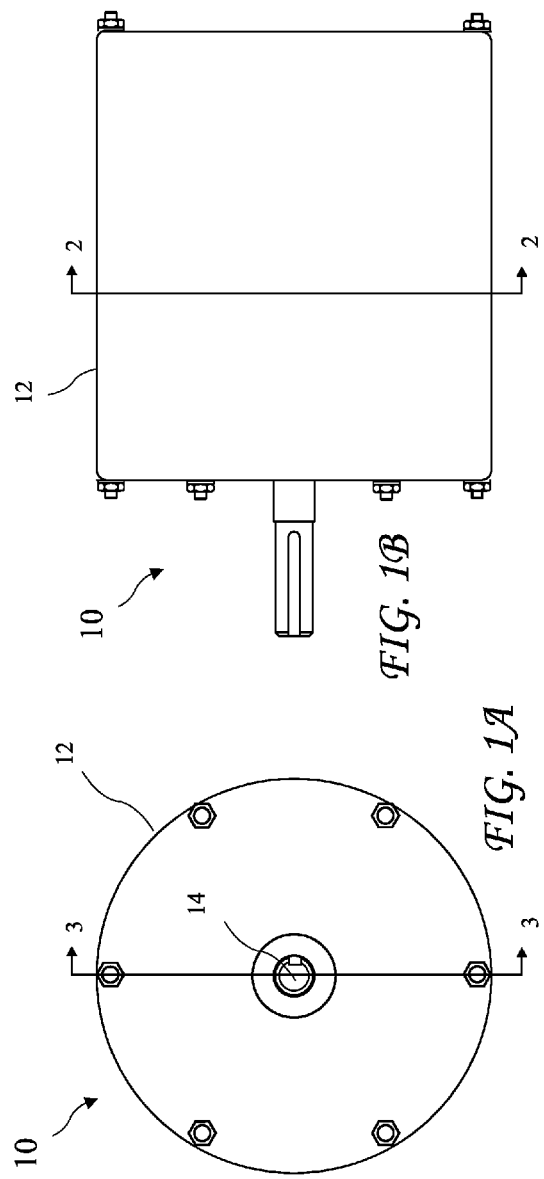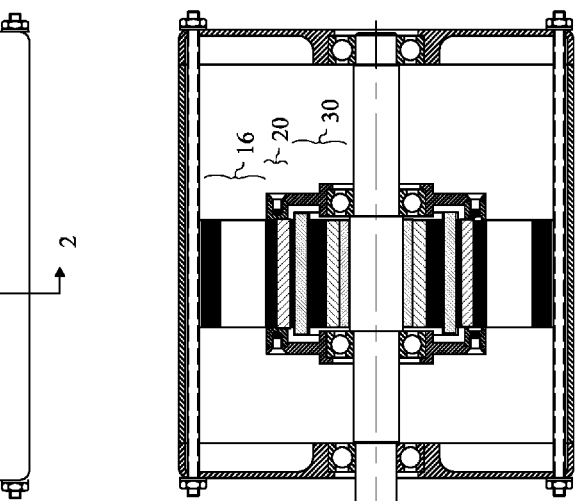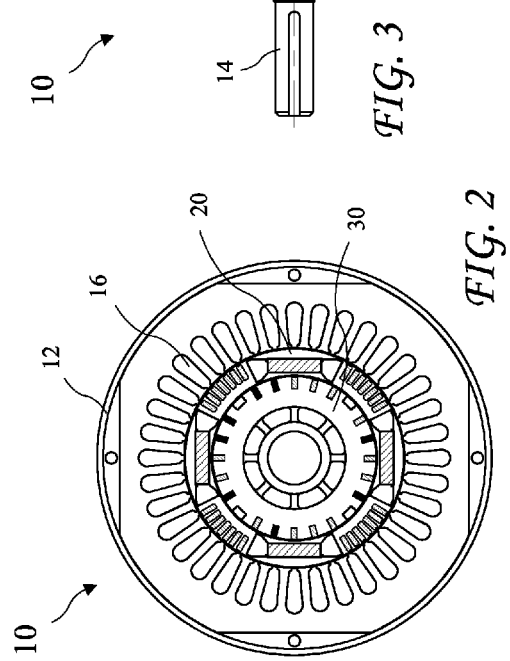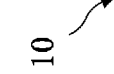
FIG. 1A
FIG. 1B
FIG. 2
FIG. 3

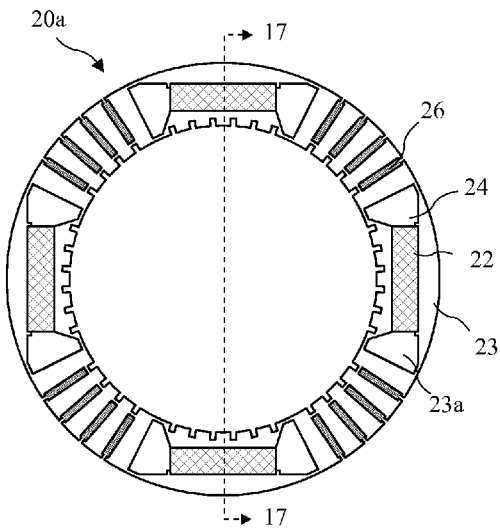 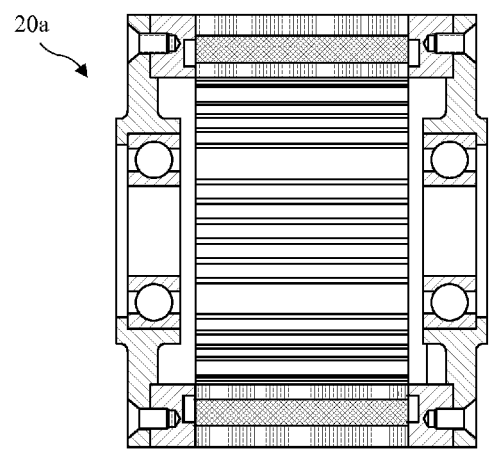
FIG. 16    FIG. 17
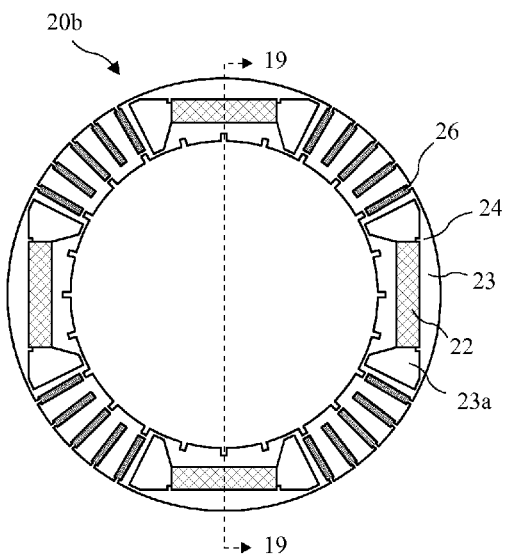 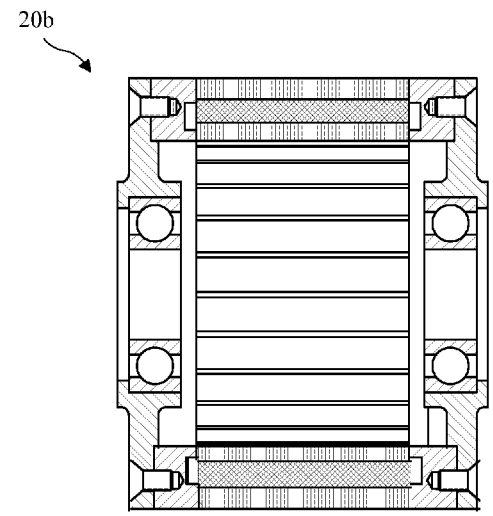
FIG. 18    FIG. 19

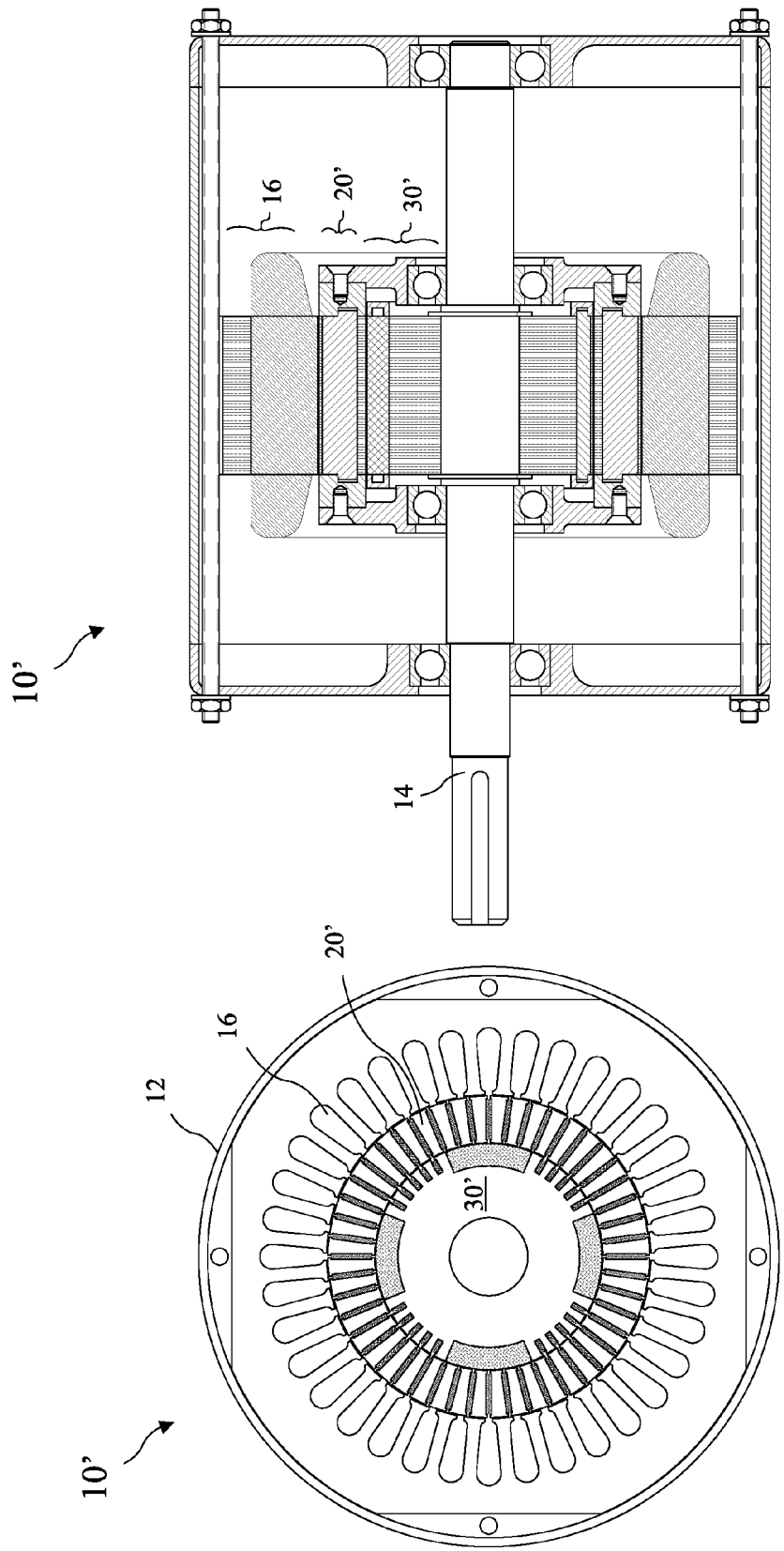

HYBRID ELECTRIC MOTOR WITH SELF ALIGNING PERMANENT MAGNET AND SQUIRREL CAGE ROTORS

The present application is a Continuation In Part of U.S. patent application Ser. No. 14/151,333 filed Jan. 9, 2014, which application is incorporated in its entirety herein by reference

BACKGROUND OF THE INVENTION

The present invention relates to electric motors and in particular to an induction motor having an independently rotating permanent magnet rotor variably coupled to an inductive rotor to reconfigure the motor from asynchronous induction operation at startup to synchronous operation after startup for efficient operation.

A preferred form of electric motors are brushless AC induction motors. The rotors of induction motors include a cage (or squirrel cage resembling a "hamster wheel") rotating inside a stator. The cage comprises axially running bars angularly spaced apart on the outer perimeter of the rotor. An AC current provided to the stator introduces a rotating stator magnetic field inside the rotor, and the rotating field inductively induces current in the bars. The current induced in the bars creates an induced magnetic field which cooperates with the stator magnetic field to produce torque and thus rotation of the rotor.

The introduction of current into the bars requires that the bars are not moving (or rotating) synchronously with the rotating stator magnetic field because electromagnetic induction requires relative motion (called slipping) between a magnetic field and a conductor in the field. As a result, the rotor must slip with respect to the rotating stator magnetic field to induce current in the bars to produce torque, and the induction motors are therefore called asynchronous motors.

Unfortunately, low power induction motors are not highly efficient at designed operating speed, and are even less efficient under reduced loads because the amount of power consumed by the stator remains constant at such reduced loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

U.S. patent application Ser. No. 14/151,333 filed Jan. 9, 2014 filed by the present Applicant discloses an electric motor having an outer stator, an inner rotor including bars, fixed to a motor shaft, and a free spinning outer rotor including permanent magnets and bars, residing between the inner rotor and the stator. At startup, a rotating stator field accelerates the free spinning outer rotor, and after accelerating, the permanent magnets of the free spinning outer rotor accelerate and then lock with the inner rotor to achieve efficient permanent magnet operation.

The design of the '333 application is suitable for some motor designs, but in other designs, surface effects on the surface of the inner rotor reduce or prevent coupling of the inner rotor with the rotating magnetic fields.

BRIEF SUMMARY OF THE INVENTION

The present invention addresses the above and other needs by providing a hybrid induction motor which includes a fixed stator, an independently rotating outer rotor, and an inner rotor fixed to a motor shaft. In one embodiment the outer rotor includes spaced apart first bars and permanent magnets, and the inner rotor includes spaced apart second bars. In another embodiment the outer rotor includes angularly spaced apart first bars but no permanent magnets, and the inner rotor includes permanent magnets and may also include angularly spaced apart second bars. The outer rotor is initially accelerated by cooperation of a rotating stator magnetic field with the first bars. As the outer rotor accelerates towards synchronous RPM, the inner rotor is accelerated to transition to efficient synchronous operation. The outer rotor thus acts as a clutch to decouple the inner rotor from the rotating stator magnetic field at startup and to couple the inner rotor to the rotating stator magnetic field at synchronous speed.

In accordance with one embodiment of the invention, there is provided a hybrid induction motor which includes a fixed stator, an independently rotating hybrid permanent magnet/squirrel cage (HPMSC) outer rotor, and a Squirrel Cage (SC) inner rotor fixed to a motor shaft. The HPMSC rotor has N angularly spaced part permanent magnets and N sets of a plurality of first bars angularly spaced apart between consecutive permanent magnets. The SC rotor has N groups of angularly spaced apart second bars, and slots in an outer surface of the SC rotor between consecutive groups of the second bars. The HPMSC rotor is initially accelerated by cooperation of the stator with the first bars. The permanent magnets create a rotating magnetic field in the SC rotor cooperating with the second bars to accelerate the SC rotor. As the HPMSC rotor accelerates towards synchronous RPM, the stator field reaches into the HPMSC rotor and cooperates with the permanent magnets to transition to synchronous operation. Salient poles are created by cooperation of the permanent magnets with the slots in the SC rotor to lock the two rotors at synchronous RPM.

In accordance with another aspect of the invention, there is provided an inner Squirrel Cage (SC) rotor having angularly spaced apart axially extending slots on an outer surface of the inner SC rotor. The spacing of the slots matching the spacing of permanent magnets in an independently rotating hybrid permanent magnet/squirrel cage (HPMSC) outer rotor. At synchronous speed the slots and permanent magnets cooperate to form salient poles coupling the rotation of the SC inner rotor with the HPMSC outer rotor, eliminating a need for mechanical coupling of the HPMSC outer rotor with the SC inner rotor.

In accordance with yet another aspect of the invention, there is provided a motor having an improved sequence of inductive startup and transition to efficient synchronous operation. The design of the first bars of the HPMSC outer rotor produces sufficient torque to over come the drag of the SC inner rotor created by the permanent magnets. As a result, the HPMSC outer rotor reaches synchronous RPM quickly. As the HPMSC outer rotor accelerates faster than the SC inner rotor, the cooperation of the permanent magnets and the second bars of the SC inner rotor create more torque on SC inner rotor to accelerate the SC inner rotor. When first rotor reaches near synchronous rpm, the stator flux penetrates to second bars of the SC inner rotor applying additional torque to further accelerate the SC inner rotor toward synchronous RPM.

In accordance with still another aspect of the invention, there is provided a motor having an HPMSC outer rotor and SC inner rotor coupled by the cooperation of permanent magnets in the HPMSC outer rotor and axially extending slots in the surface of the SC inner rotor. The depth of the slots may be altered based on the purpose of the motor to optimize locking of the SC inner rotor to the HPMSC outer rotor.

In accordance with another embodiment of the invention, there is provided a hybrid induction motor which includes a fixed stator, an independently rotating Squirrel Cage (SC) outer rotor, and a Permanent Magnet (PM) inner rotor fixed to a motor shaft. The SC outer rotor has angularly spaced apart first bars. The PM inner rotor may include groups of second bars in spaces between the permanent magnets. The SC outer rotor is initially accelerated by cooperation of a rotating stator magnetic field with the first bars. As the SC outer rotor accelerates towards synchronous RPM, the stator field reaches through the SC outer rotor and cooperates with the PM inner rotor to accelerate the PM inner rotor to transition to synchronous operation. The SC outer rotor thus acts as a clutch to decouple the PM inner rotor from the rotating stator magnetic field at startup and to couple the PM inner rotor to the rotating stator magnetic field at synchronous speed. As the SC outer rotor accelerates, magnetic flux of the permanent magnets in the PM inner rotor cooperates with the first bars in the SC outer rotor producing torque and accelerating the PM inner rotor simultaneously. As the SC outer rotor RPM increases closer to stator flux RPM, the stator flux penetrates the SC outer rotor and imparts more flux on the PM inner rotor adding additional torque to the PM inner rotor to accelerate the PM inner rotor to synchronous operation.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A shows an end view of an electric motor having an independently rotating Hybrid Permanent Magnet/squirrel Cage (HPMSC) outer rotor and a Squirrel Cage (SC) inner rotor fixedly coupled to a motor shaft, according to the present invention.

FIG. 1B shows a side view of the electric motor having an independently rotating HPMSC outer rotor and a Squirrel Cage (SC) inner rotor fixedly coupled to a motor shaft, according to the present invention.

FIG. 2 shows a cross-sectional view of the electric motor having the independently rotating HPMSC outer rotor and the SC inner rotor fixedly coupled to a motor shaft taken along line 2-2 of FIG. 1B, according to the present invention.

FIG. 3 shows a cross-sectional view of the electric motor having the independently rotating HPMSC outer rotor and the SC inner rotor fixedly coupled to a motor shaft taken along line 3-3 of FIG. 1A, according to the present invention.

FIG. 16 shows a cross-sectional view of the second embodiment of the independently rotating HPMSC outer rotor taken along line 2-2 of FIG. 1B, according to the present invention.

FIG. 17 shows a cross-sectional view of the second embodiment of the independently rotating HPMSC outer rotor taken along line 17-17 of FIG. 16, according to the present invention.

FIG. 18 shows a cross-sectional view of the third embodiment of the independently rotating HPMSC outer rotor taken along line 2-2 of FIG. 1B, according to the present invention.

FIG. 19 shows a cross-sectional view of the third embodiment of the independently rotating HPMSC outer rotor taken along line 19-19 of FIG. 18, according to the present invention.

FIG. 24 shows a cross-sectional view of a second embodiment the electric motor having an independently rotating SC outer rotor and an HPMSC inner rotor fixedly coupled to a motor shaft taken along line 2-2 of FIG. 1B, according to the present invention.

FIG. 25 shows a cross-sectional view of the second embodiment of the electric motor having the independently rotating SC outer rotor and the HPMSC inner rotor fixedly coupled to a motor shaft taken along line 3-3 of FIG. 1A, according to the present invention.

Corresponding reference characters indicate corresponding components throughout the several views of the drawings.

DETAILED DESCRIPTION OF THE INVENTION

Figure 4:
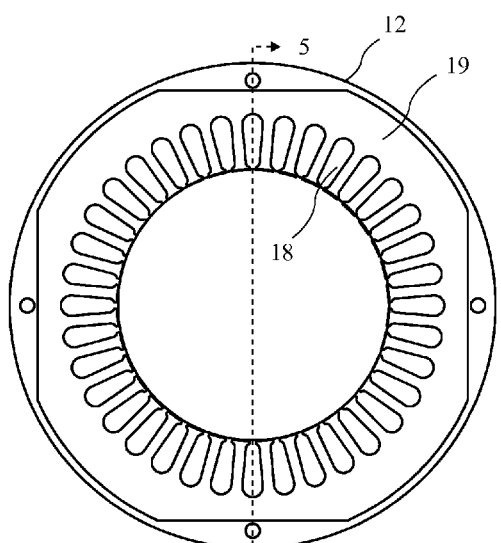
FIG. 4 shows a cross-sectional view of a housing and fixed stator portion of the electric motor having the independently rotating HPMSC outer rotor and the SC inner rotor fixedly coupled to a motor shaft taken along line 2-2 of FIG. 1B, according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

An end view of an electric motor 10 having an independently rotating Hybrid Permanent Magnet/Squirrel Cage (HPMSC) outer rotor 20 and a Squirrel Cage (SC) inner rotor 30 fixedly coupled to a motor shaft 14, according to the present invention is shown in FIG. 1A, and a side view of the electric motor 10 is shown in FIG. 1B. A cross-sectional view of the electric motor 10 taken along line 2-2 of FIG. 1B, is shown in FIG. 2, and a cross-sectional view of the electric motor 10 taken along line 3-3 of FIG. 1A is shown in FIG. 3. The electric motor 10 includes a housing 12, a stator portion 16 fixedly coupled to the housing 12, the independently rotating HPMSC outer rotor 20 riding on bearings 29 (see FIG. 7), and the SC inner rotor 30 fixed to the motor shaft 14.

Figure 5:
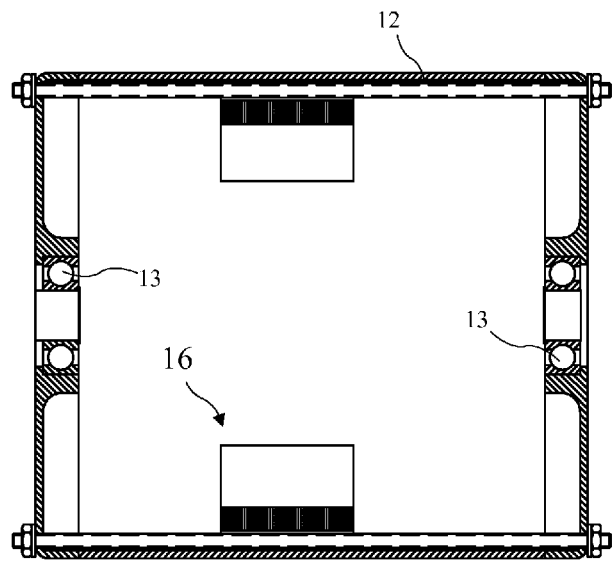
FIG. 5 shows a cross-sectional view of the housing and the fixed stator portion of the electric motor having the independently rotating HPMSC outer rotor and the SC inner rotor fixedly coupled to a motor shaft taken along line 5-5 of FIG. 4, according to the present invention.

A cross-sectional view of the housing 12 and fixed stator portion 16 of the electric motor 10 taken along line 2-2 of FIG. 1B, is shown in FIG. 4 and a cross-sectional view of the housing 12 and the fixed stator portion 16 taken along line 5-5 of FIG. 4, is shown in FIG. 5. Fixed stator windings 18 reside in a stator core 19. The stator windings 18 create a rotating stator magnetic field when provided with an Alternating Current (AC) signal. The housing 12 includes bearings 13 for carrying the shaft 14.

Figure 6:
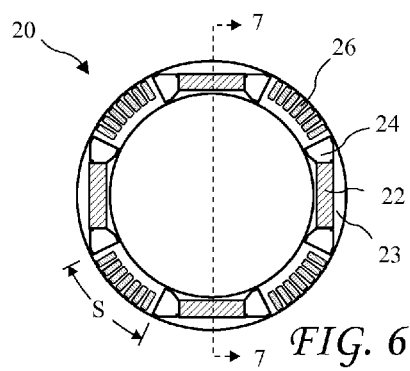
FIG. 6 shows a cross-sectional view of the independently rotating HPMSC outer rotor of the electric motor having the independently rotating HPMSC outer rotor and the SC inner rotor fixedly coupled to a motor shaft taken along line 2-2 of FIG. 1B, according to the present invention.
Figure 7:
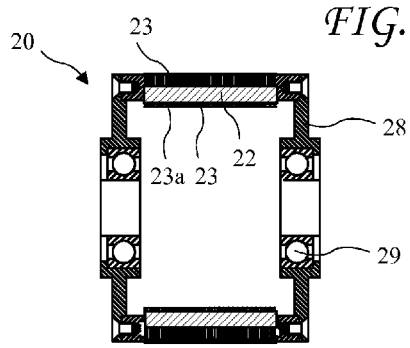
FIG. 7 shows a cross-sectional view of the independently rotating HPMSC outer rotor of the electric motor having the independently rotating HPMSC outer rotor and the SC inner rotor fixedly coupled to a motor shaft taken along line 7-7 of FIG. 6, according to the present invention.

A cross-sectional view of the independently rotating HPMSC outer rotor 20 taken along line 2-2 of FIG. 1B, is shown in FIG. 6 and a cross-sectional view of the independently rotating HPMSC outer rotor 20 taken along line 7-7 of FIG. 6, is shown in FIG. 7. The HPMSC outer rotor 20 includes angularly spaced apart permanent magnets 22 and angularly spaced apart first bars 26 residing in a first rotor core 23. The HPMSC outer rotor 20 may include any even number of permanent magnets 22, for example, two, four, six, eight, etc. permanent magnets 22. Non-ferrous gaps 24 in the rotor core 23 are present at ends of each permanent magnet 22 and the angular width between successive magnets 22 and gaps 24 is an angular segment S. The gaps 24 are air gaps or non ferrous material to minimize flux leakage, if a ferrous material was present at ends of the magnets 22, magnetic flux would curl back into the magnets 22, shorting much of the magnetic flux lines back into the magnets 22. The core 23 is preferably a laminated core 38 and thin sections 23a of the core 23 holding the lamination sections together are considered areas of flux leakage. The thickness of the thin areas 23a are preferably optimized to minimize the leakage while maintaining mechanical integrity of the rotor core 23. The bars 26 are not necessarily but are preferably evenly angularly spaced apart and angularly between the magnets 22.

Rotor end caps 28 are attached to opposite ends of the HPMSC outer rotor 20 and include bearings 29 allowing the HPMSC outer rotor 20 to rotate freely on the motor shaft 14. The bearings 29 are preferably low friction bearings (for example, ball bearings), but may simple be bushings (for example, bronze bushings or oilite bushings).

Figure 8:
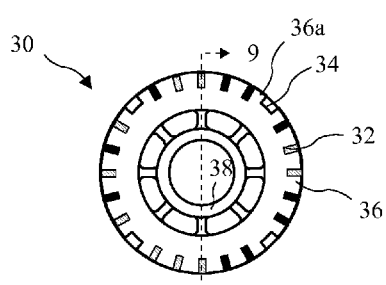
FIG. 8 shows a cross-sectional view of an SC inner rotor of the electric motor having the independently rotating HPMSC outer rotor and the SC inner rotor fixedly coupled to a motor shaft taken along line 2-2 of FIG. 1B, according to the present invention.
Figure 9:
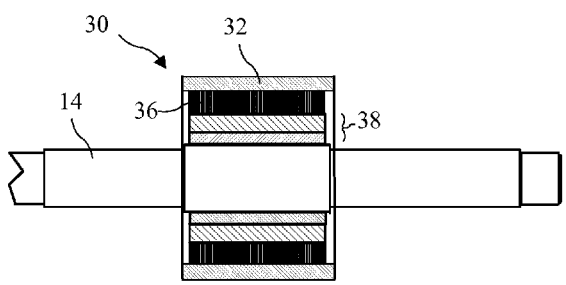
FIG. 9 shows a cross-sectional view of the SC inner rotor of the electric motor having the independently rotating HPMSC outer rotor and the SC inner rotor fixedly coupled to a motor shaft taken along line 9-9 of FIG. 8, according to the present invention.

A cross-sectional view of the SC inner rotor 30 of the electric motor 10 taken along line 2-2 of FIG. 1B, is shown in FIG. 8 and a cross-sectional view of the SC inner rotor 30 of the electric motor 10 taken along line 9-9 of FIG. 8, is shown in FIG. 9. The SC inner rotor 30 is fixed to the motor shaft 14 and couples the HPMSC outer rotor 20 to the motor shaft 14. Second bars 36 reside in a second rotor core 36. The bars are not necessarily but are preferably evenly angularly spaced apart, but are more preferably bi-laterally symmetric (i.e., are in symmetric pairs on opposite sides. A balance between bar 26 resistance and rotor core 23 saturation may be optimized and the shape, number and dimensions of the bars 26 may have great effect on performance, for example, motor startup.

Angularly spaced apart, axially extending slots 34 are formed in a cylindrical outer face 36a of the rotor core 36. The number and spacing of the slots 34 are matched to the number and spacing of the magnets 22 in the HPMSC outer rotor 20. The size, and particularly, the depth, of the slots 34 substantially determine the coupling of the HPMSC outer rotor 20 to the SC inner rotor 30 by affecting the salient poles 50 (see FIG. 11). The salient poles 50 in turn determine the coupling between the HPMSC outer rotor 20 and the SC inner rotor 30 when the motor 10 operates at synchronous speed.

Figure 10:
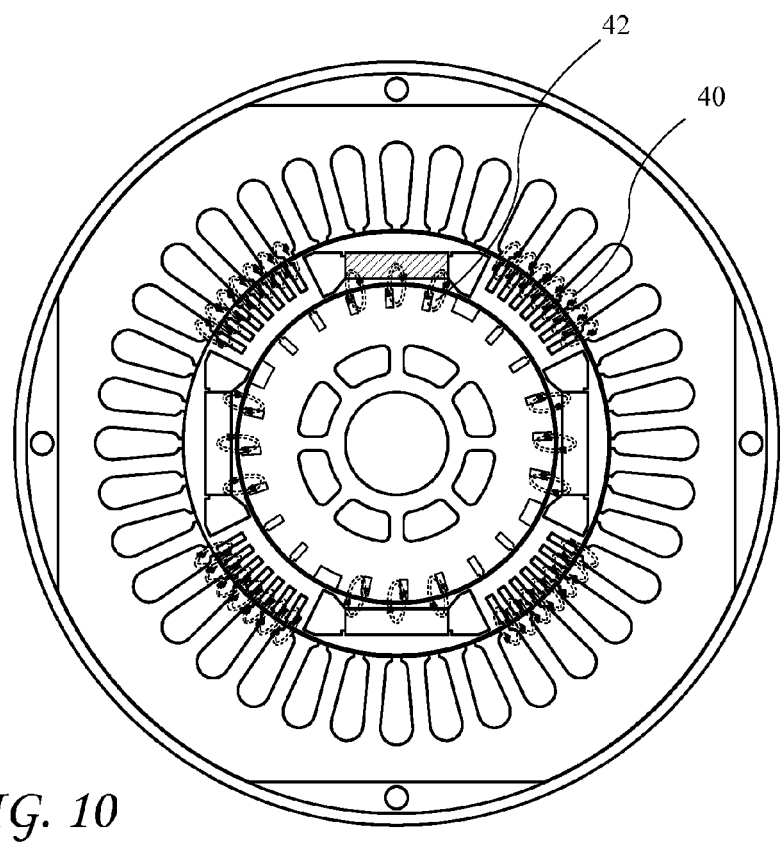
FIG. 10 shows a cross-sectional view of the electric motor having the independently rotating HPMSC outer rotor and the SC inner rotor fixedly coupled to a motor shaft showing magnetic field lines at startup taken along line 2-2 of FIG. 1B, according to the present invention.

A cross-sectional view of the electric motor 10 at startup, taken along line 2-2 of FIG. 1B, is shown in FIG. 10. When AC power is provided to the stator 16, the rotating stator magnetic field inductively cooperates with the first bars 26 in the HPMSC outer rotor 20 to create current in the first bars 26 and the resulting magnetic flux lines 40. However, at start up, the interaction of the rotating stator magnetic field with the stationary rotor bars produces a rotor frequency causing a surface effect, and the rotating stator magnetic field does not penetrate deeply into HPMSC outer rotor 20 and therefore does not reach to portions of the first rotor bars 26 below the surface of the HPMSC outer rotor 20. The rotating stator field then accelerates the HPMSC outer rotor 20. The second bars 32 in the SC inner rotor 30 cooperate with the magnets 22 in the HPMSC outer rotor 20 to accelerate the SC inner rotor 30.

The slots 34 in the SC inner rotor 30 do not align with the magnets 22 at start up because the HPMSC outer rotor 20 accelerates first, causing the magnets 22 (and thus the magnet magnetic field) the skip over the salient poles 50, but still inductively cooperating with second bars 32 of the SC inner rotor 30 until the SC inner rotor 30 reaches near synchronous rpm where the attraction of the salient poles 50 to the magnets 22 is sufficient to hold the SC inner rotor 30 at the same RPM as the HPMSC outer rotor 20. The design of salient poles 50 determines the coupling torque. The coupling torque is designed to be slightly higher than the rated torque of motor to hold the SC inner rotor 30 at the same RPM as the HPMSC outer rotor 20 during normal operation. This design is also advantageous because the design prevents the motor 10 from completely stalling during overload because when the load on the motor shaft 14, and thus on the SC inner rotor 30, exceeds the motor design torque, the SC inner rotor 30 can break away from the HPMSC outer rotor 20 leaving the HPMSC outer rotor 20 at synchronous RPM.

As the HPMSC outer rotor 20 increases in RPM, the rotor frequency decreases, as this occurs the rotating stator magnetic field reaches deeper into HPMSC outer rotor 20 and into the SC inner rotor 30, creating a duel cage rotor effect of a bar section at the surface of rotor and larger section bars deeper into rotor, producing more starting resistance reducing current spikes.

Figure 11:
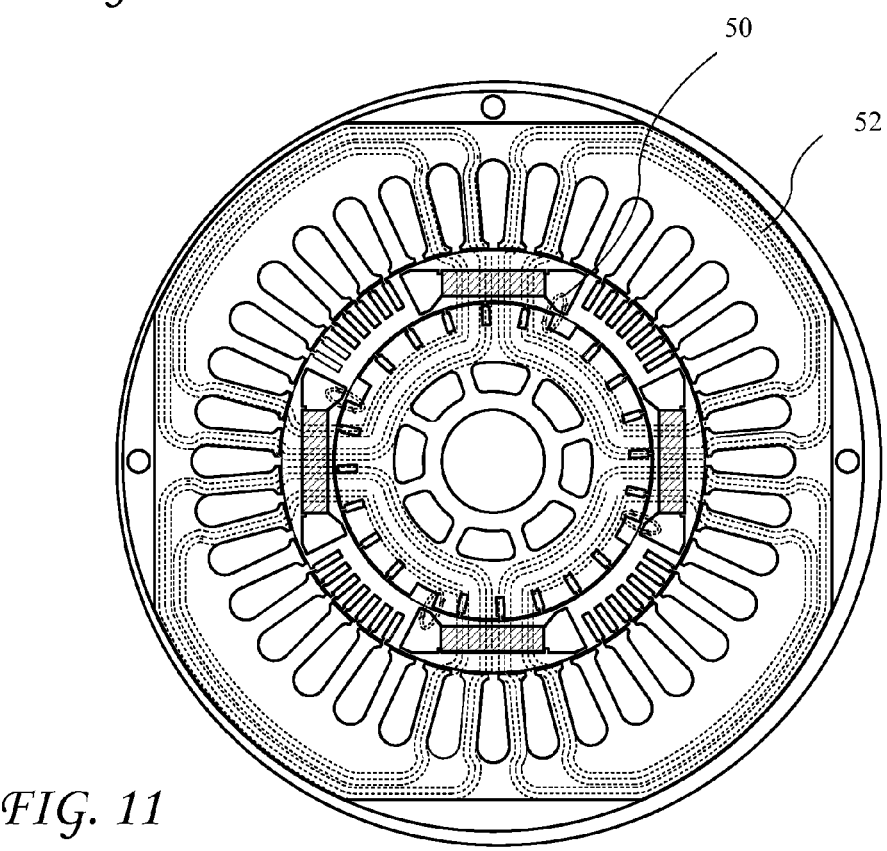
FIG. 11 shows a cross-sectional view of the electric motor having the independently rotating HPMSC outer rotor and the SC inner rotor fixedly coupled to a motor shaft showing magnetic field lines at synchronous speed taken along line 2-2 of FIG. 1B, according to the present invention.

A cross-sectional view of the electric motor 10 at synchronous speed, taken along line 2-2 of FIG. 1B, is shown in FIG. 11. As the HPMSC outer rotor 20 and the SC inner rotor 30 approach synchronous speed the rotor frequency decreases, the cooperation of the HPMSC outer rotor 20 with the rotating stator magnetic field transitions from induction to permanent magnet operation and the magnetic flux 40 and 42 diminishes and flux lines 52 passing though the magnets 22 and into the SC inner rotor 30 grow, resulting the HPMSC outer rotor 20 converging to synchronous operation. The HPMSC outer rotor 20 continues to pull the SC inner rotor 30 towards synchronous speed, and the salient poles 50 couple the SC inner rotor 30 to the HPMSC outer rotor 20 for efficient permanent magnet synchronous operation.

Figure 12:
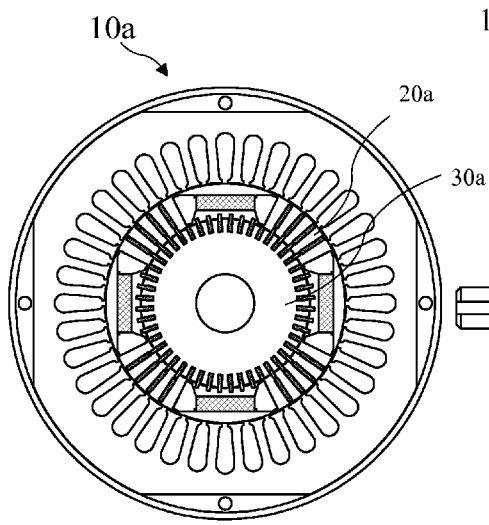
FIG. 12 shows a cross-sectional view of the electric motor having second embodiments of the independently rotating HPMSC outer rotor and the SC inner rotor fixedly coupled to a motor shaft taken along line 2-2 of FIG. 1B, according to the present invention.
Figure 13:
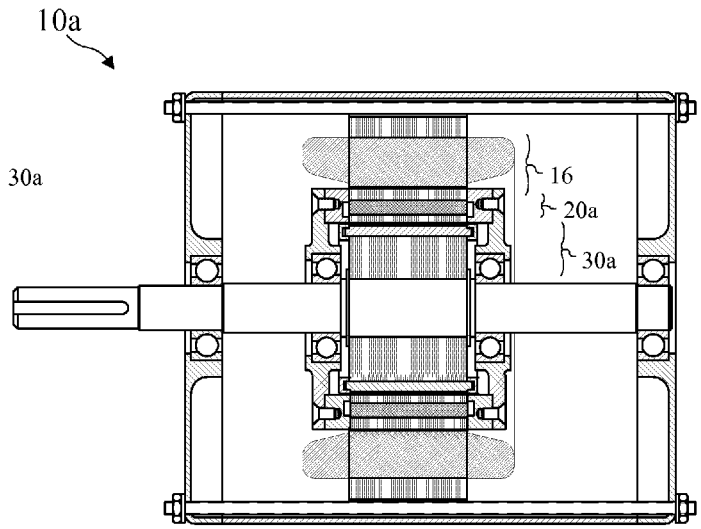
FIG. 13 shows a cross-sectional view of the electric motor having the second embodiments of the independently rotating HPMSC outer rotor and the SC inner rotor fixedly coupled to a motor shaft taken along line 3-3 of FIG. 1A, according to the present invention.

A cross-sectional view of the electric motor 10a having second embodiments of the independently rotating HPMSC outer rotor 20a and the SC inner rotor 30a fixedly coupled to a motor shaft taken along line 2-2 of FIG. 1B, is shown in FIG. 12, and a cross-sectional view of the electric motor 10a taken along line 3-3 of FIG. 1A, is shown in FIG. 13. The SC inner rotor 30a does not include the slots 34 of the SC inner rotor 30.

Figure 14:
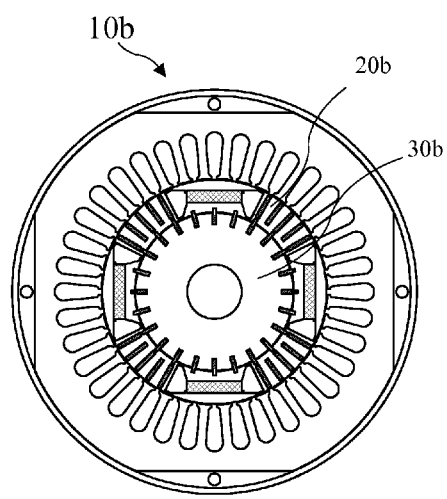
FIG. 14 shows a cross-sectional view of the electric motor having third embodiment of the independently rotating HPMSC outer rotor and the SC inner rotor fixedly coupled to a motor shaft taken along line 2-2 of FIG. 1B, according to the present invention.
Figure 15:
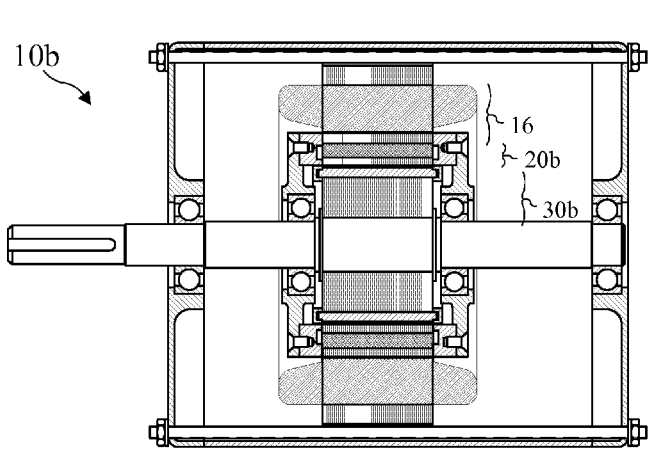
FIG. 15 shows a cross-sectional view of the electric motor having the third embodiments of the independently rotating HPMSC outer rotor and the SC inner rotor fixedly coupled to a motor shaft taken along line 3-3 of FIG. 1A, according to the present invention.

A cross-sectional view of the electric motor 10b having third embodiment of the independently rotating HPMSC outer rotor 20b and the SC inner rotor 30b fixedly coupled to a motor shaft taken along line 2-2 of FIG. 1B, is shown in FIG. 14 and a cross-sectional view of the electric motor 10b taken along line 3-3 of FIG. 1A, is shown in FIG. 15. The SC inner rotor 30b does not include the slots 34 of the SC inner rotor 30.

A cross-sectional view of the second embodiment of the independently rotating HPMSC outer rotor 20a taken along line 2-2 of FIG. 1B, is shown in FIG. 16 and a cross-sectional view of the rotor 20a taken along line 17-17 of FIG. 16, is shown in FIG. 17. The HPMSC outer rotor 20a includes four bars 26 between consecutive magnets 22.

A cross-sectional view of the third embodiment of the independently rotating HPMSC outer rotor 20b taken along line 2-2 of FIG. 1B, is shown in FIG. 18 and a cross-sectional view of the HPMSC outer rotor 20b taken along line 19-19 of FIG. 18, is shown in FIG. 19. The HPMSC outer rotor 20*b* includes five bars 26 between consecutive magnets 22.

Figure 20:
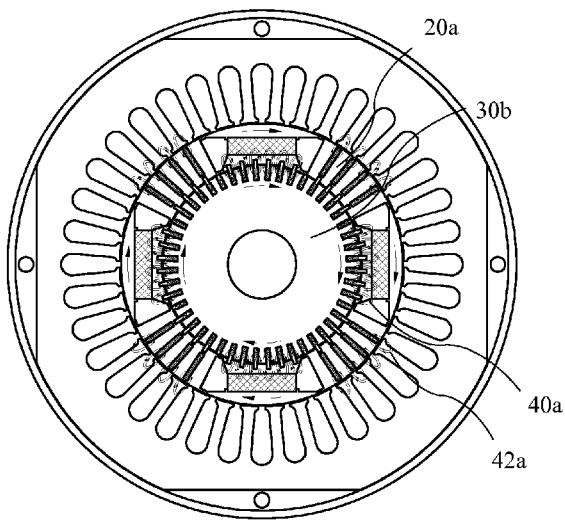
FIG. 20 shows a cross-sectional view of the second embodiment of the electric motor having the independently rotating HPMSC outer rotor and the SC inner rotor fixedly coupled to a motor shaft, showing magnetic field lines at startup taken along line 2-2 of FIG. 1B, according to the present invention.
Figure 21:
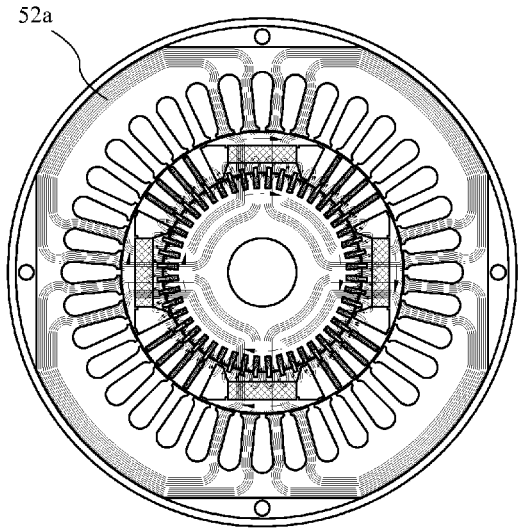
FIG. 21 shows a cross-sectional view of the second embodiment of the electric motor having the independently rotating HPMSC outer rotor and the SC inner rotor fixedly coupled to a motor shaft, showing magnetic field lines at synchronous speed taken along line 2-2 of FIG. 1B, according to the present invention.

A cross-sectional view of the second embodiment of the electric motor 10*a* showing magnetic field lines 40*a* and 42*a* at startup taken along line 2-2 of FIG. 1B, is shown in FIG. 20 and a cross-sectional view of the electric motor 10*a* showing magnetic field lines 52*a* at synchronous speed taken along line 2-2 of FIG. 1B, is shown in FIG. 21. The magnetic field lines transition similarly to the transitions described in FIGS. 10 and 11.

Figure 22:
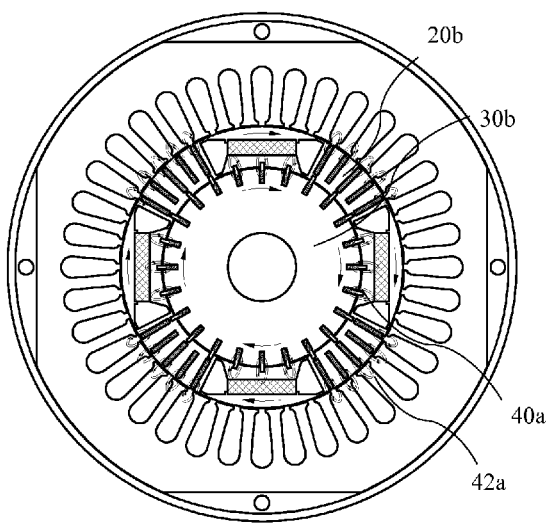
FIG. 22 shows a cross-sectional view of the third embodiment of the electric motor having the independently rotating HPMSC outer rotor and the SC inner rotor fixedly coupled to a motor shaft at startup taken along line 2-2 of FIG. 1B, according to the present invention.
Figure 23:
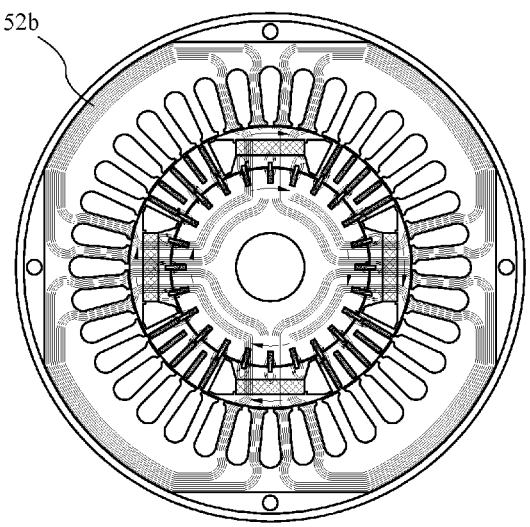
FIG. 23 shows a cross-sectional view of the third embodiment of the electric motor having the independently rotating HPMSC outer rotor and the SC inner rotor fixedly coupled to a motor shaft at synchronous speed taken along line 2-2 of FIG. 1B, according to the present invention.

A cross-sectional view of the electric motor 10*b* showing magnetic field lines 40*b* and 42*b* at startup, taken along line 2-2 of FIG. 1B, is shown in FIG. 22, and a cross-sectional view of the electric motor 10*b* showing magnetic field lines at synchronous speed taken along line 2-2 of FIG. 1B, is shown in FIG. 23. The magnetic field lines transition similarly to the transitions described in FIGS. 10 and 11.

A first embodiment of the invention thus discloses a clutch-less hybrid squirrel cage/permanent magnet motor comprising:

a motor housing;

a stator fixed to the motor housing and producing a rotating stator magnetic field;

a motor shaft rotatably connected to the motor housing and extending from at least one end of the motor housing for attachment to a load;

a hybrid squirrel cage/permanent magnet rotor residing coaxial with the motor shaft and having a first rotor core, a number N of angularly spaced apart permanent magnets embedded in the rotor core, non-ferrous gaps in the rotor core present at ends of each permanent magnet, and first bars embedded in the rotor core, the hybrid squirrel cage/permanent magnet rotor capable of rotating independently of the motor shaft; and a squirrel cage rotor residing coaxial with the motor shaft and having a second rotor core, second bars embedded in the second rotor core, and the number N uniformly angularly spaced apart axially running slots on a surface of the second rotor core facing the hybrid squirrel cage/permanent magnet rotor, and the squirrel cage rotor rotationally fixed to the motor shaft.

The first embodiment may further include:

the squirrel cage rotor is an inner squirrel cage rotor residing inside the hybrid squirrel cage/permanent magnet rotor;

the squirrel cage rotor is axially aligned with the hybrid squirrel cage/permanent magnet rotor;

at startup the first bars of the hybrid squirrel cage/ permanent magnet rotor inductively cooperate with the rotating stator magnetic field to apply torque to the hybrid squirrel cage/permanent magnet rotor, and the second bars of the squirrel cage rotor shunt the permanent magnets of the hybrid squirrel cage/permanent magnet rotor, to facilitate initial acceleration of the hybrid squirrel cage/permanent magnet rotor;

as the hybrid squirrel cage/permanent magnet rotor accelerates, the permanent magnets create a rotating magnetic field inductively cooperating with the second bars of the squirrel cage rotor, and accelerating the squirrel cage rotor;

as both the hybrid squirrel cage/permanent magnet rotor and the squirrel cage rotor approach synchronous operation:

the slots on the surface of the squirrel cage rotor cooperate with the permanent magnets and the non-ferrous gaps at ends of each permanent magnet of the hybrid squirrel cage/permanent magnet rotor to create salient poles magnetically coupling rotation of the squirrel cage rotor to the hybrid squirrel cage/permanent magnet rotor; and the rotating stator magnetic field couples with the permanent magnets, passing through the permanent magnets into the squirrel cage inner rotor, in synchronous operation with the permanent magnets;

the permanent magnets comprise an even number of permanent magnets;

the hybrid squirrel cage/permanent magnet rotor includes end caps holding bearings, the bearings riding on the motor shaft;

the combined permanent magnets and gaps at ends of the permanent magnets in the hybrid squirrel cage/permanent magnet rotor are angularly spaced apart by angular segments S, and the first bars in the hybrid squirrel cage/permanent magnet rotor reside uniformly angularly spaced apart in the angular segments S;

the first bars in the hybrid squirrel cage/permanent magnet rotor are at a common radius; or the hybrid squirrel cage/permanent magnet outer rotor resides between the squirrel cage rotor and the stator.

The first embodiment may further be described as a method for clutch-less hybrid squirrel cage/permanent magnet motor operation comprising:

providing an AC signal to a fixed rotor;

creating a rotating stator magnetic field cooperating with a two part rotor comprising:

a hybrid squirrel cage/permanent magnet outer rotor residing coaxial with a motor shaft and having a first rotor core, a number N of angularly spaced apart permanent magnets embedded in the rotor core, non-ferrous gaps in the rotor core present at ends of each permanent magnet, and first bars embedded in the rotor core, the hybrid squirrel cage/permanent magnet rotor capable of rotating independently of the motor shaft; and a squirrel cage inner rotor residing coaxial with the motor shaft and having a second rotor core, second bars embedded in the second rotor core, and the number N uniformly angularly spaced apart axially running slots on a surface of the second rotor core facing the hybrid squirrel cage/permanent magnet rotor, and the squirrel cage rotor rotationally fixed to the motor shaft;

the rotating stator magnetic field inductively cooperating with the first bars of the hybrid squirrel cage/permanent magnet rotor to create torque on the hybrid squirrel cage/ permanent magnet rotor;

shunting a magnetic field of the permanent magnets by the second bars residing of the squirrel cage rotor, thereby reducing an effect of preventing acceleration of the hybrid squirrel cage/permanent magnet rotor due to the permanent magnets;

accelerating the hybrid squirrel cage/permanent magnet rotor towards synchronous RPM;

creating a permanent magnet rotating permanent magnet field;

the rotating permanent magnet field inductively cooperating with the second bars of the squirrel cage rotor to create torque on the squirrel cage rotor;

as the hybrid squirrel cage/permanent magnet rotor and squirrel cage rotors approach synchronous RPM, the slots on the surface of the squirrel cage rotor cooperating with the permanent magnets and the non-ferrous gaps at ends of each permanent magnet of the hybrid squirrel cage/permanent magnet rotor to create salient poles magnetically coupling rotation of the squirrel cage rotor to the hybrid squirrel cage/permanent magnet rotor; and the rotating stator magnetic field coupling with the permanent magnets, passing through the permanent magnets into the squirrel cage inner rotor, in synchronous operation with the permanent magnets.

Figure 26:
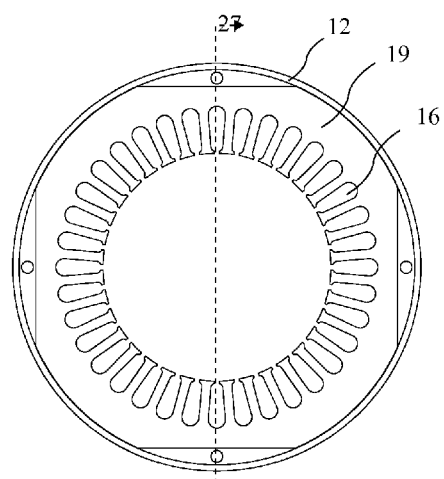
FIG. 26 shows a cross-sectional view of a housing and fixed stator portion of the second embodiment of the electric motor having the independently rotating SC outer rotor and the HPMSC inner rotor fixedly coupled to a motor shaft taken along line 2-2 of FIG. 1B, according to the present invention.
Figure 27:
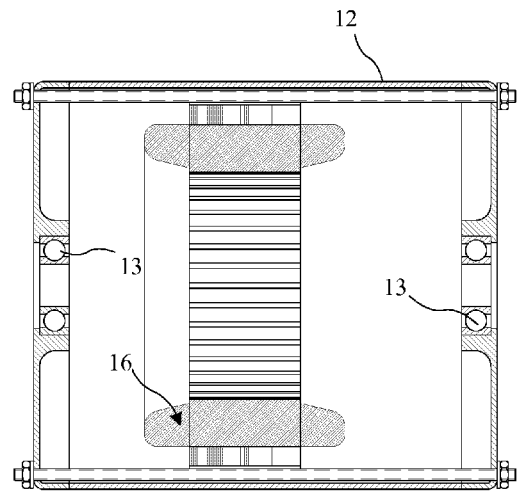
FIG. 27 shows a cross-sectional view of the housing and the fixed stator portion of the second embodiment of the electric motor having the independently rotating SC outer rotor and the HPMSC inner rotor fixedly coupled to a motor shaft taken along line 27-27 of FIG. 26, according to the present invention.
Figure 28:
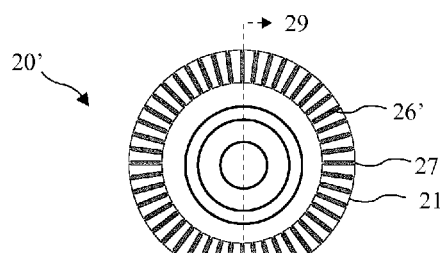
FIG. 28 shows a cross-sectional view of the independently rotating SC outer rotor of the second embodiment of the electric motor having the independently rotating SC outer rotor and the HPMSC inner rotor fixedly coupled to a motor shaft taken along line 2-2 of FIG. 1B, according to the present invention.
Figure 29:
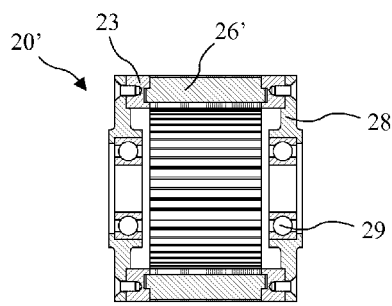
FIG. 29 shows a cross-sectional view of the independently rotating SC outer rotor of the second embodiment of the electric motor having the independently rotating SC outer rotor and the HPMSC inner rotor fixedly coupled to a motor shaft taken along line 29-29 of FIG. 28, according to the present invention.
Figure 30:
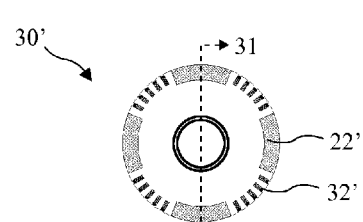
FIG. 30 shows a cross-sectional view of an HPMSC inner rotor of the second embodiment of the electric motor having the independently rotating SC outer rotor and the HPMSC inner rotor fixedly coupled to a motor shaft taken along line 2-2 of FIG. 1B, according to the present invention.
Figure 31:
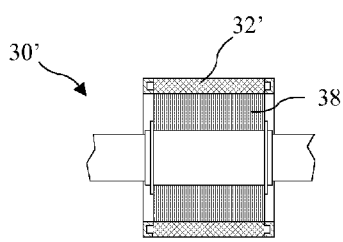
FIG. 31 shows a cross-sectional view of the HPMSC inner rotor of the second embodiment of the electric motor having the independently rotating SC outer rotor and the HPMSC inner rotor fixedly coupled to a motor shaft taken along line 31-31 of FIG. 30, according to the present invention.

A cross-sectional view of a second embodiment the electric motor 10' having the independently rotating SC outer rotor 20' and a PM inner rotor 30' fixedly coupled to a motor shaft taken along line 2-2 of FIG. 1B, is shown in FIG. 24 and a cross-sectional view of the second embodiment of the electric motor 10' taken along line 3-3 of FIG. 1A, is shown in FIG. 25. A cross-sectional view of a housing 12 and the fixed stator portion 16 of the second embodiment of the electric motor 10' taken along line 2-2 of FIG. 1B, is shown in FIG. 26, a cross-sectional view of the housing 12 and the fixed stator portion 16 of the second embodiment of the electric motor 10' taken along line 27-27 of FIG. 26, is shown in FIG. 27, a cross-sectional view of the independently rotating SC outer rotor 20' of the second embodiment of the electric motor 10' taken along line 2-2 of FIG. 1B, is shown in FIG. 28, a cross-sectional view of the independently rotating SC outer rotor 20' taken along line 29-29 of FIG. 28, is shown in FIG. 29, a cross-sectional view of an SC inner rotor 30' taken along line 2-2 of FIG. 1B, is shown in FIG. 30, and a cross-sectional view of the SC inner rotor 30' taken along line 31-31 of FIG. 30, is shown in FIG. 31.

The SC outer rotor 20' includes first bars 26' and small gaps 27 between the bars 26' and the surface 21 of the SC outer rotor 20'. The first bars 26' initially cooperate with the rotating stator magnetic field to inductively accelerate the SC outer rotor, and later cooperate with the permanent magnets. The gaps 21 may be air gaps or a non ferrous material. If no gaps 21 are present, an iron bridge may result diminishing the inductive effect by creating flux leakage between bars 26' acting as poles as the polarities switch back and forth during start up when rotor frequencies are highest reducing acceleration of the SC outer rotor, however, some iron bridging may be acceptable and a motor according to the present invention experiencing some iron bridging is intended to come within the scope of the present invention.

The PM inner rotor 30' includes permanent magnets 22' and may include second bars 32'. As acceleration of the SC outer rotor creates a rotor frequency between the inner and outer rotors, inductive cooperation between the first bars 26' and the permanent magnets 22' accelerates the inner rotor 30' towards synchronous RPM.

Figure 32:
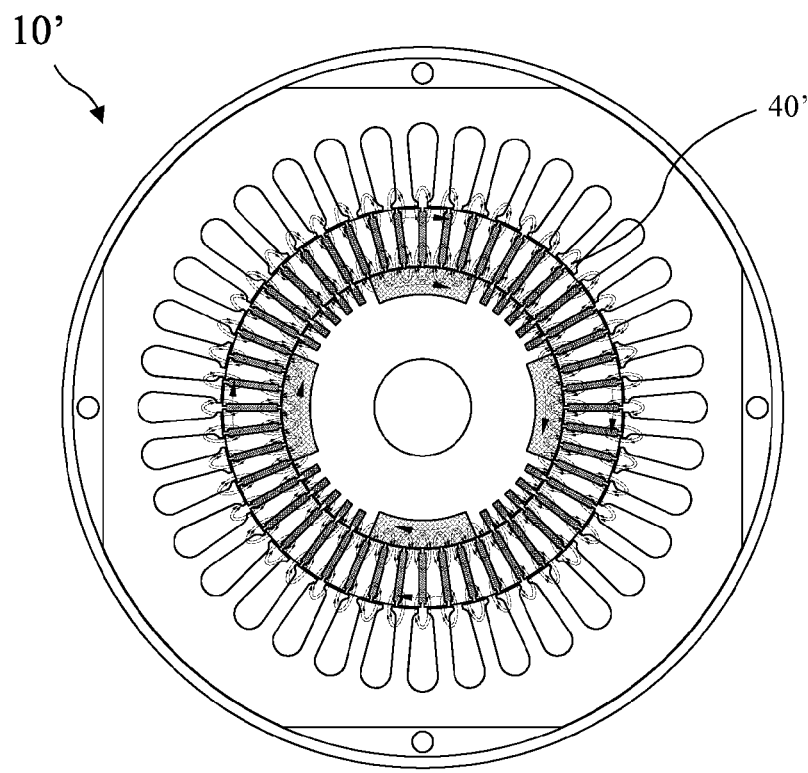
FIG. 32 shows a cross-sectional view of the second embodiment of the electric motor, showing magnetic field lines at startup, taken along line 2-2 of FIG. 1B, according to the present invention.
Figure 33:
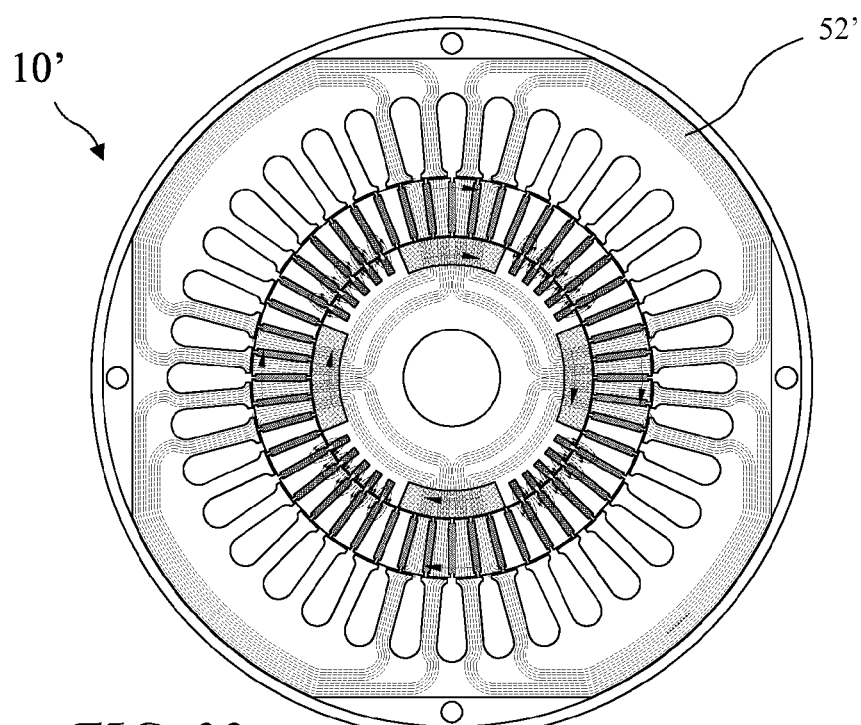
FIG. 33 shows a cross-sectional view of the second embodiment of the electric motor, showing magnetic field lines at synchronous speed, taken along line 2-2 of FIG. 1B, according to the present invention.

A cross-sectional view of the second embodiment of the electric motor 10', showing magnetic field lines at startup, taken along line 2-2 of FIG. 1B, is shown in FIG. 32 and a cross-sectional view of the second embodiment of the electric motor 10', showing magnetic field lines at synchronous speed, taken along line 2-2 of FIG. 1B is shown in FIG. 33. At start up, when frequencies (e.g., the difference between the stator magnetic field RPM and rotor RPM) are highest, the magnetic flux lines 40' tend to stay close to surface, this is called the skin or surface effect. The electric motor 10' takes advantage of the skin effect for starting because the rotating stator flux cooperates with the first bars in the SC outer rotor which is not substantially affected by the permanent magnet flux from the PM inner rotor flux because the skin effect reduces the cooperation of the permanent magnets in the PM inner rotor with the SC outer rotor.

At near synchronous the rotor frequencies are low, and at synchronous operation the rotor frequency is 0, and the magnetic flux lines 52' are not in shear and penetrate deep into rotor iron providing a deep bar effect. As the SC outer rotor RPM increases, the skin effect also comes into play coupling the first bars 26' in the SC outer rotor 20' to the permanent magnets 22' in the PM inner rotor 30' as the frequency between the SC outer rotor 20' and the PM inner rotor 30' increases, producing torque to accelerate the PM inner rotor 30'.

Figure 34:
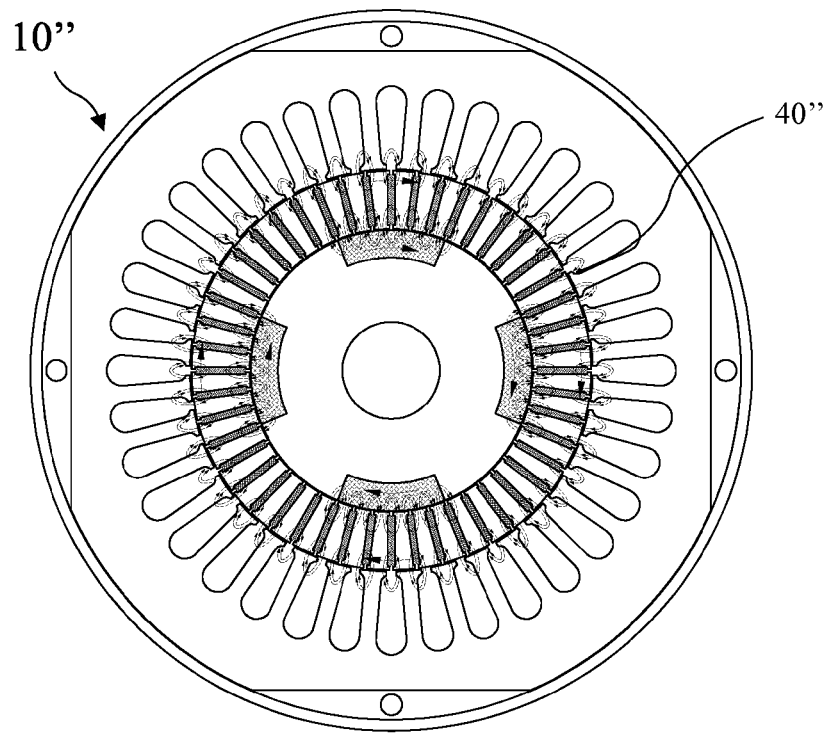
FIG. 34 shows a cross-sectional view of the second embodiment of the electric motor having no bars in the inner rotor showing magnetic field lines at startup taken along line 2-2 of FIG. 1B, according to the present invention.
Figure 35:
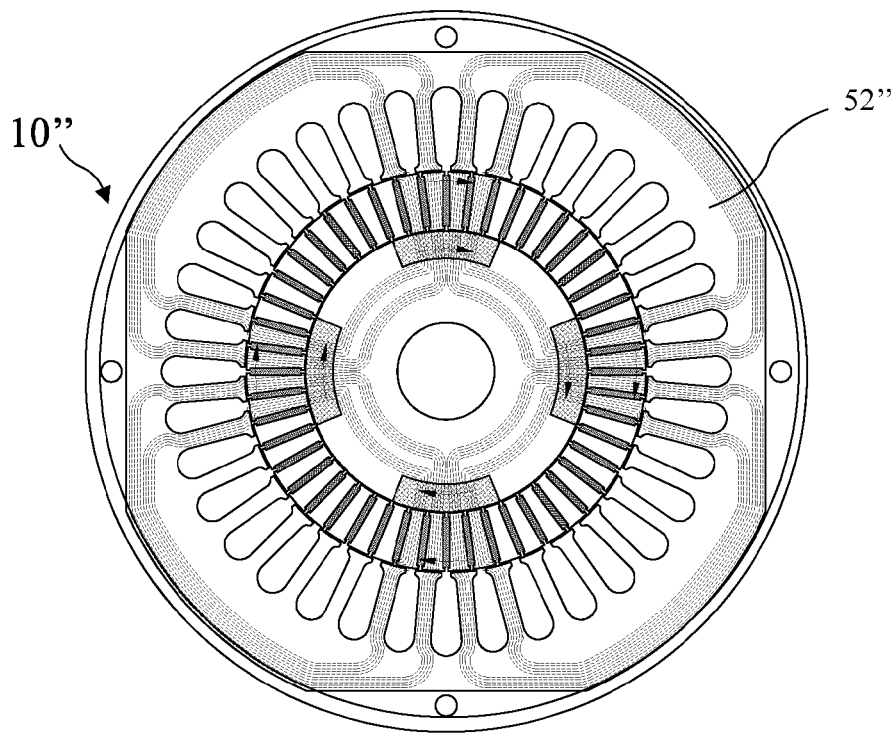
FIG. 35 shows a cross-sectional view of the second embodiment of the electric motor having no bars in the inner rotor showing magnetic field lines at synchronous speed taken along line 2-2 of FIG. 1B, according to the present invention.

A cross-sectional view of the second embodiment of the electric motor 10" having no bars in the inner rotor, showing magnetic field lines, at startup, taken along line 2-2 of FIG. 1B, is shown in FIG. 34, and a cross-sectional view of the second embodiment of the electric motor 10" taken along line 2-2 of FIG. 1B, showing magnetic field lines at synchronous speed, is shown in FIG. 35. The magnetic field lines 40" and 52" are similar to the magnetic field lines 40' and 52' with a difference being an absence of lines between the first bars 26' and second bars 32' which are no longer present. The electric motor 10" provides an advantage of a more simple and less expensive design compared to the electric motor 10'.

Figures 36A, 36B, 36C, 37A, 37B:
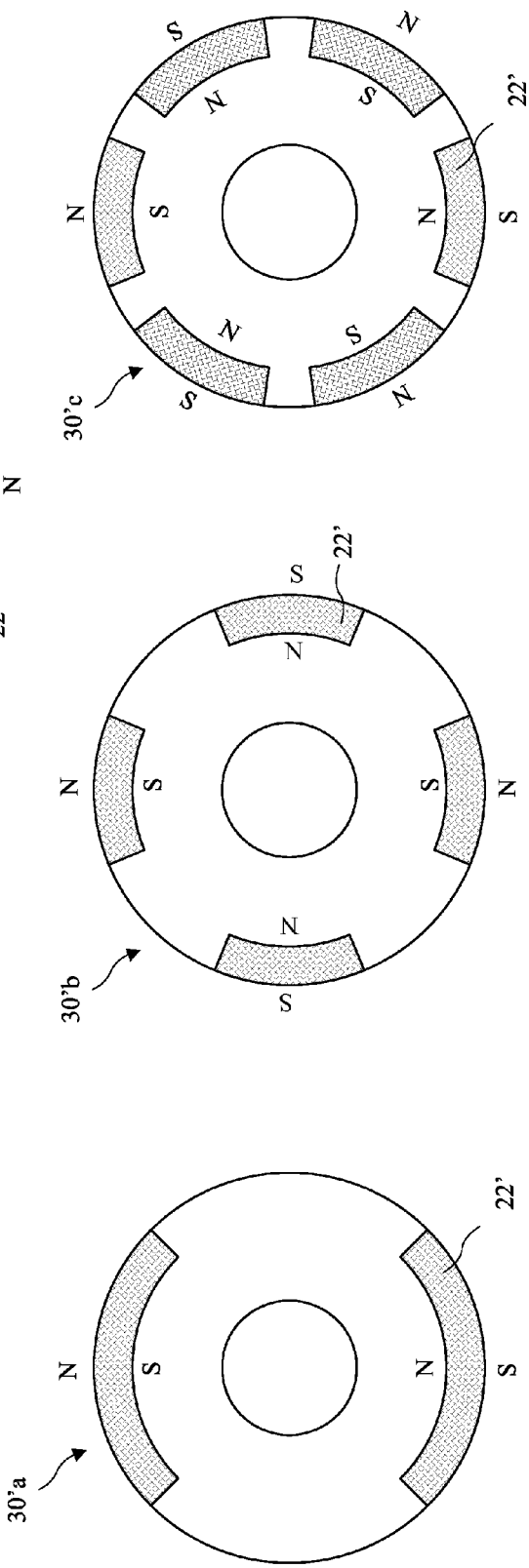
FIG. 36A shows a first embodiment of a PM inner rotor according to the present invention.
FIG. 36B shows a second embodiment of a PM inner rotor according to the present invention.
FIG. 36C shows a third embodiment of a PM inner rotor according to the present invention.
FIG. 37A shows a fourth embodiment of a PM inner rotor according to the present invention.
FIG. 37B shows a fifth embodiment of a PM inner rotor according to the present invention.

A first embodiment of a PM inner rotor 30'$a$ is shown in FIG. 36$a$, a second embodiment of a PM inner rotor 30'$b$ is shown in FIG. 36B, and a third embodiment of a PM inner rotor 30'$c$ is shown in FIG. 36C. The PM inner rotor 30'$a$ includes two permanent magnets 22', the PM inner rotor 30'$b$ includes four permanent magnets 22', and the PM inner rotor 30'$c$ includes six permanent magnets 22'. Second bars 32' may or may not reside between the permanent magnets 22'.

A fourth embodiment of a PM inner rotor 30'$d$ is shown in FIG. 37A and a fifth embodiment of a PM inner rotor 30'$e$ is shown in FIG. 37B. A PM inner rotor 30$d$ includes two permanent magnets 22" in contact, and a PM inner rotor 30$e$ includes four permanent magnets 22" in contact. The permanent magnets 22" may be low cost ferrite magnets.

Several embodiments of hybrid electric motors having an inner rotor rotationally fixed to the motor shaft residing coaxial with the motor shaft and having a second rotor core, and at least one of second electrically conductive squirrel cage bars embedded in the second rotor core and a number N of the permanent magnets embedded in the second rotor core, and an outer rotor residing between the stator and inner rotor and coaxial with the motor shaft and capable of rotating independently of the motor shaft and having a first rotor core and first electrically conductive squirrel cage bars embedded in the rotor core, wherein the permanent magnets reside in at least one of the inner rotor and the outer rotor, are described above. Those skilled in the art will recognize other embodiments not described here with different numbers of magnets, bars, and slots, but relying on the principles disclosed here, and those embodiments are intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A hybrid squirrel cage and permanent magnet motor comprising: a motor housing; a stator fixed to the motor housing and producing a rotating stator magnetic field at a synchronous speed; a motor shaft rotatably connected to the motor housing and configured for attachment to a load; permanent magnets; an inner rotor rotationally fixed to the motor shaft residing coaxial with the motor shaft and having an inner rotor core, and inner electrically conductive squirrel cage bars embedded in the inner rotor core; an outer rotor residing between the stator and inner rotor and coaxial with the motor shaft and having an outer rotor core and outer electrically conductive squirrel cage bars embedded in the outer rotor core, the outer rotor not rotationally mechanically coupled with the inner rotor and the motor shaft during any operation and not rotationally mechanically coupled with the inner rotor and the motor shaft at any speed, other than mechanical rotational coupling through bearings supporting the outer rotor; permanent magnets residing in at least one of the inner rotor and the outer rotor; and the outer rotor is magnetically rotationally coupled to the Inner rotor at the synchronous speed.

2. The motor of claim 1, wherein the outer rotor is not mechanically rotationally connect to any motor input shaft or output shaft.

3. The motor of claim 1, wherein the outer rotor is not rotationally coupled to any external load at startup and the outer rotor is rotationally magnetically coupled to an external load at synchronous speed through magnetic coupling with the inner rotor.

4. The motor of claim 1, wherein the outer rotor is not mechanically rotationally coupled to any motor shaft or any load or power input device during any operation or speed of the motor.

5. The motor of claim 1, wherein the permanent magnets are embedded in the inner rotor core of the inner rotor.

6. The motor of claim 5, wherein the inner electrically conductive squirrel cage bars in the inner rotor reside in angular gaps between the permanent magnets.

7. The motor of claim 5, wherein the outer electrically conductive squirrel cage bars of the outer rotor extend radially through the outer rotor.

8. The motor of claim 7, wherein the permanent magnets embedded in the inner rotor core of the inner rotor, extending out radially to an outer face of the inner rotor.

9. The motor of claim 8, wherein:
at startup, the rotating stator magnetic field inductively cooperates with outer ends of the outer electrically conductive squirrel cage bars proximal to a first outer face of the outer rotor, to accelerate the outer rotor, and the rotating stator magnetic field does not directly penetrate through the outer rotor to directly cooperate with the permanent magnets in the inner rotor; and
as the outer rotor accelerates towards synchronous speed reducing slippage between the rotating stator magnetic field and the outer electrically conductive squirrel cage bars in the outer rotor, the rotating stator magnetic field reaches through the outer rotor and cooperates directly with the permanent magnets in the inner rotor to accelerate the inner rotor to synchronous speed.

10. The motor of claim 1, wherein the permanent magnets are embedded in the outer rotor core of the outer rotor.

11. The motor of claim 10, wherein:
the outer electrically conductive squirrel cage bars embedded in the outer rotor are angularly spaced apart groups of bars; and
the permanent magnets reside in angular spaces between the angularly spaced apart groups of bars.

12. The motor of claim 10, further including non-ferrous gaps at ends of the permanent magnets.

13. The motor of claim 12, wherein the non-ferrous gaps are air gaps.

14. The motor of claim 10, further including angularly spaced apart, axially extending slots in a cylindrical outer face of the inner rotor, the slots angularly spaced part to align with the permanent magnets in the outer rotor core.

15. The motor of claim 14, wherein the number of slots in the inner rotor is equal to the number of permanent magnets in the outer rotor.

16. The motor of claim 14, wherein:
the inner electrically conductive squirrel cage bars embedded in the inner rotor core are angularly spaced apart groups of bars; and
the axially extending slots reside in angular spaces between the angularly spaced apart groups of more than one bars.

17. The motor of claim 16, wherein:
at startup, the rotating stator magnetic field inductively cooperates with the outer electrically conductive squirrel cage bars of the outer rotor to accelerate the outer rotor, and the permanent magnets of the outer rotor create a second rotating magnetic field cooperating with the inner electrically conductive squirrel cage bars of the inner rotor to inductively accelerate the inner rotor;
as the outer rotor and the inner rotor accelerate towards synchronous speed reducing slippage between the rotating stator magnetic field and the outer electrically conductive squirrel cage bars in the outer rotor, the rotating stator magnetic field reaches through the permanent magnets in the outer rotor and cooperates directly with the inner electrically conductive squirrel cage bars in the inner rotor, to further accelerate the inner rotor with the rotating stator magnetic field synchronously cooperating with the permanent magnets; and
the slots in a cylindrical outer face of the inner rotor creating salient poles coupling the outer and inner rotors to accelerate the inner rotor to synchronous speed.

18. A hybrid squirrel cage and permanent magnet motor comprising: a motor housing; a stator fixed to the motor housing and producing a rotating stator magnetic field at a synchronous speed; a motor shaft rotatably connected to the motor housing and configured for attachment to a load; an inner rotor rotationally fixed to the motor shaft residing coaxial with the motor shaft and having an inner rotor core and inner electrically conductive squirrel cage bars embedded in the inner rotor core, and a number N of permanent magnets embedded in the inner rotor core; and an outer rotor residing between the stator and inner rotor and coaxial with the motor shaft and capable of rotating independently of the motor shaft, the inner rotor, and the stator, and having an outer rotor core and outer electrically conductive squirrel cage bars embedded in the outer rotor core, the outer rotor not rotationally coupled to any motor shaft at startup, and the outer rotor is not mechanically rotationally coupled to any motor shaft, load, or power input device during any operation or speed of the motor, other than mechanical rotational coupling through bearings supporting the outer rotor; and the outer rotor is magnetically rotationally coupled to the Inner rotor at the synchronous speed.

19. The motor of claim 18, wherein small gaps are present between the outer electrically conductive squirrel cage bars and a surface of the outer rotor.

20. A hybrid squirrel cage and permanent magnet motor comprising: a motor housing; a stator fixed to the motor housing and producing a rotating stator magnetic field at a synchronous speed; a motor shaft rotatably connected to the motor housing and configured for attachment to a load; an inner rotor rotationally fixed to the motor shaft residing coaxial with the motor shaft and having an inner rotor core, and including inner electrically conductive squirrel cage bars embedded in the inner rotor core; and an outer rotor residing between the stator and inner rotor and coaxial with the motor shaft and capable of rotating independently of the motor shaft and having a number N of the permanent magnets embedded in an outer rotor core and outer electrically conductive squirrel cage bars embedded in the outer rotor core, the outer rotor not rotationally coupled to any motor shaft at startup, and the outer rotor is not mechanically rotationally coupled to any motor shaft, load, or power input device during any operation or speed of the motor, other than mechanical rotational coupling through bearings supporting the outer rotor; and the outer rotor is magnetically rotationally coupled to the inner rotor at the synchronous speed.

* * * * *